(12) United States Patent
Plache

(10) Patent No.: US 10,868,714 B2
(45) Date of Patent: Dec. 15, 2020

(54) CONFIGURABLE DEVICE STATUS

(71) Applicant: Rockwell Automation Technologies, Inc., Mayfield Heights, OH (US)

(72) Inventor: Kenneth S. Plache, Scottsdale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 137 days.

(21) Appl. No.: 16/134,316

(22) Filed: Sep. 18, 2018

(65) Prior Publication Data

US 2019/0149400 A1 May 16, 2019

Related U.S. Application Data

(60) Provisional application No. 62/586,121, filed on Nov. 14, 2017.

(51) Int. Cl.
| | | |
|---|---|---|
| *H04L 12/00* | (2006.01) | |
| *H04L 12/24* | (2006.01) | |
| *H04Q 9/00* | (2006.01) | |
| *G05B 19/00* | (2006.01) | |
| *H04L 29/08* | (2006.01) | |

(52) U.S. Cl.
CPC .......... *H04L 41/0803* (2013.01); *G05B 19/00* (2013.01); *H04L 67/12* (2013.01); *H04L 67/34* (2013.01); *H04Q 9/00* (2013.01); *H04L 67/10* (2013.01); *H04Q 2209/40* (2013.01)

(58) Field of Classification Search
CPC ..... H04L 67/12; H04L 41/0803; H04L 67/10; H04L 67/34; H04Q 9/00; H04Q 2209/40; G05B 2219/23109; G05B 2219/37095; G05B 19/00
USPC .................................................. 709/220, 221
See application file for complete search history.

(56) References Cited

U.S. PATENT DOCUMENTS

| | | | | |
|---|---|---|---|---|
| 8,261,231 | B1* | 9/2012 | Hirsch | G06F 8/30 |
| | | | | 717/100 |
| 9,128,472 | B2* | 9/2015 | Lawson | G05B 19/4185 |
| 9,185,236 | B2* | 11/2015 | Kim | G06Q 50/26 |
| 9,363,336 | B2* | 6/2016 | Lawson | G05B 19/4185 |
| 9,380,431 | B1* | 6/2016 | Freeland | H04L 67/306 |
| 9,413,852 | B2* | 8/2016 | Lawson | G05B 19/4185 |
| 9,438,648 | B2* | 9/2016 | Asenjo | H04L 65/403 |
| 9,477,936 | B2* | 10/2016 | Lawson | G06Q 10/06315 |
| 9,536,332 | B2* | 1/2017 | Chaturvedi | G06F 11/3409 |
| 9,569,161 | B2* | 2/2017 | Coviello | G06F 3/1415 |
| 2012/0274664 | A1* | 11/2012 | Fagnou | E21B 41/00 |
| | | | | 345/660 |
| 2014/0141768 | A1* | 5/2014 | Javaid | G06F 11/34 |
| | | | | 455/423 |

(Continued)

*Primary Examiner* — Frantz Coby

(57) ABSTRACT

Techniques to facilitate device configuration for a mobile application associated with an industrial automation environment are disclosed herein. In at least one implementation, device configuration data for the mobile application is received from an application platform device registry server. The device configuration data is processed to determine at least a data retrieval configuration and a data visualization configuration. Data is retrieved from an industrial device using the data retrieval configuration, and a visualization of the data retrieved from the industrial device is presented using the data visualization configuration.

20 Claims, 9 Drawing Sheets

(56) References Cited

U.S. PATENT DOCUMENTS

| | | | |
|---|---|---|---|
| 2014/0164944 A1* | 6/2014 | Sivakumar | G06F 16/9577 |
| | | | 715/746 |
| 2016/0154575 A1* | 6/2016 | Xie | G06F 3/04842 |
| | | | 715/771 |
| 2016/0274552 A1* | 9/2016 | Strohmenger | G05B 11/01 |
| 2016/0323392 A1* | 11/2016 | Lawson | G05B 19/4185 |
| 2017/0103137 A1* | 4/2017 | Lawson | G05B 19/4185 |

* cited by examiner

CONFIGURABLE DEVICE STATUS

RELATED APPLICATIONS

This application claims the benefit of, and priority to, U.S. Provisional Patent Application No. 62/586,121, entitled "CONFIGURABLE DEVICE STATUS" filed Nov. 14, 2017, which is hereby incorporated by reference in its entirety for all purposes.

TECHNICAL FIELD

Aspects of the disclosure are related to computing hardware and software technology.

TECHNICAL BACKGROUND

Software applications that run on computing systems commonly provide some type of user client interface to present information to the user and receive user inputs. In a typical client-server architecture, an application running on a client computing system receives data transmitted from a server over a communication network for display to the user on the user client interface.

Industrial automation environments utilize machines and other devices during the industrial manufacturing process. These machines typically have various moving parts and other components that continually produce operational data over time, such as pressure, temperature, speed, and other metrics. Reviewing and monitoring this operational data is of high importance to those involved in operating an industrial enterprise.

In some cases, the operational data may be provided for display on a variety of systems and devices, such as notebook or tablet computers running standalone applications, web browsers, and the like, in order to present the information to the user. For example, a tablet computer could receive a constant stream of the operational data over a network and display this information dynamically, such as by providing live tiles, icons, charts, trends, and other graphical representations which continually receive updated operational data from external data sources, which are typically located in the industrial automation environment.

Overview

Techniques to facilitate device configuration for a mobile application associated with an industrial automation environment are disclosed herein. In at least one implementation, device configuration data is received for the application transmitted from an application platform device registry server. The device configuration data is processed to determine at least a data retrieval configuration and a data visualization configuration. Data is retrieved from an industrial device using the data retrieval configuration, and a visualization of the data retrieved from the industrial device is presented using the data visualization configuration.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
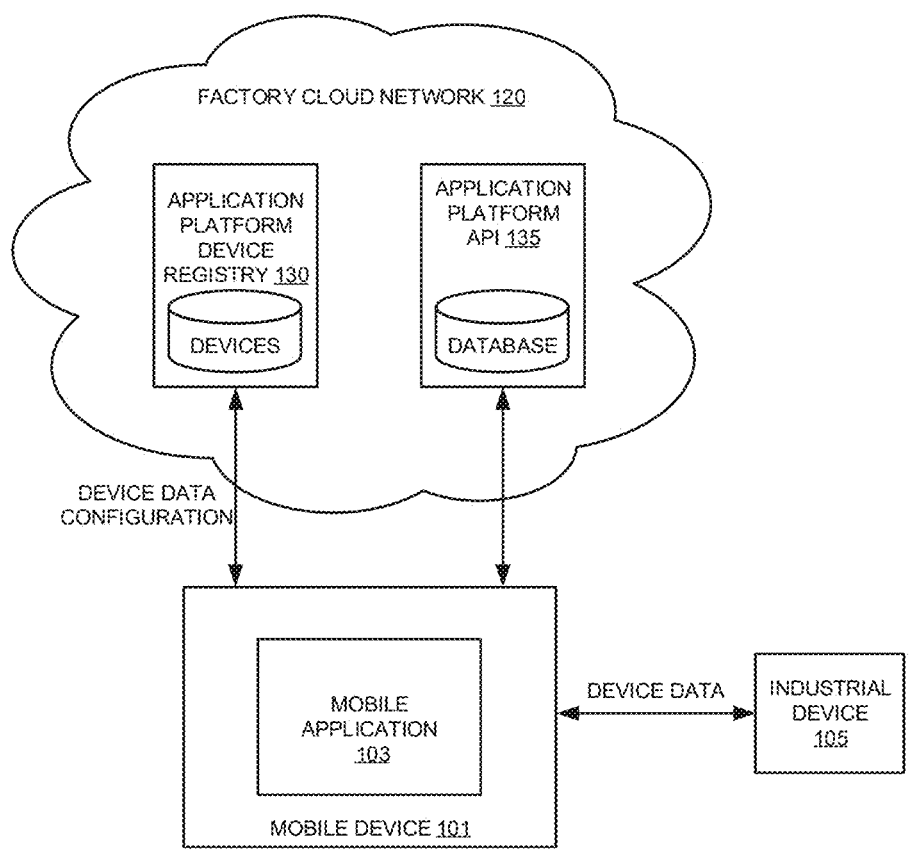
FIG. 1 is a block diagram that illustrates a communication system in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In traditional mobile applications, acquisition and visualization of device data are typically coded directly into the application. For example, adding support for new devices in an application traditionally required coding both the data acquisition and visualization components into the application for each new device type. However, implementations disclosed herein provide for an extensible device registration system that provides the ability to configure, rather than code, the device data acquisition and associated visualizations for devices that are added to the application. For example, a mobile application may use different configuration data for each device to augment the device's general status information. In some examples, data acquisition from the devices may use the common industrial protocol (CIP), including digital signal interface (DSI), DPI, and other attributes, digital addressable lighting interface (DALI), open platform communications (OPC) unified architecture (UA), hypertext transfer protocol (HTTP) mechanisms such as representational state transfer (REST) and socket.IO, and any other device communication protocol, including combinations thereof. Some examples of industrial devices that may be supported by the device configuration data include industrial control systems such as industrial controllers and programmable logic controllers (PLCs), motion control products such as servo drives, servo motors, and actuators, encoders that electronically monitor positions of rotating components, and any other machine, component, or device that may be utilized in industrial operations. In at least one implementation, a device registry service provides the mechanisms to store the device configuration data for the mobile application. The mobile application can then automatically receive the device configuration data from the device registry service for dynamic registration of the data acquisition and visualization mechanisms for plant floor devices. The device registry service can run in the cloud as a cloud service, on-premise on the manufacturing network, and on any other network or service, including combinations thereof. In some implementations, the device registry service and the mobile application may include mechanisms to validate and verify device configuration updates. Among other benefits, such validation and verification techniques may provide a defense against incorrectly configured devices, and upon update failure, may facilitate automatic rollback to a previous good device revision.

The techniques disclosed herein facilitate device configuration for a mobile application associated with an industrial automation environment. In at least one implementation, a computing system receives device configuration data for the application transmitted from an application platform device registry server. The computing system then processes the device configuration data to determine at least a data retrieval configuration and a data visualization configuration of a new device or device type for the application. Data is then retrieved from an industrial device using the data retrieval configuration, and a visualization of the data retrieved from the industrial device is presented using the data visualization configuration.

Figure 2:
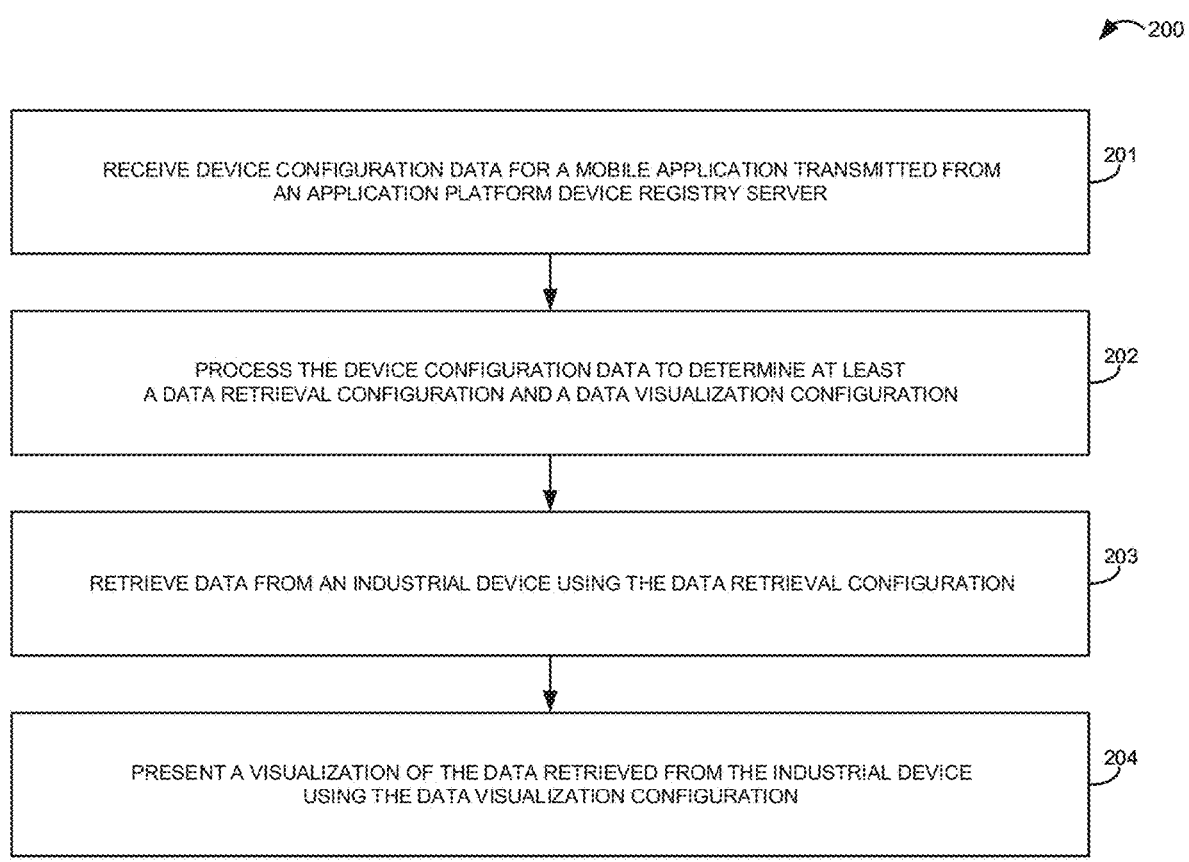
FIG. 2 is a block diagram that illustrates a process flow in an exemplary embodiment.
Figure 3:
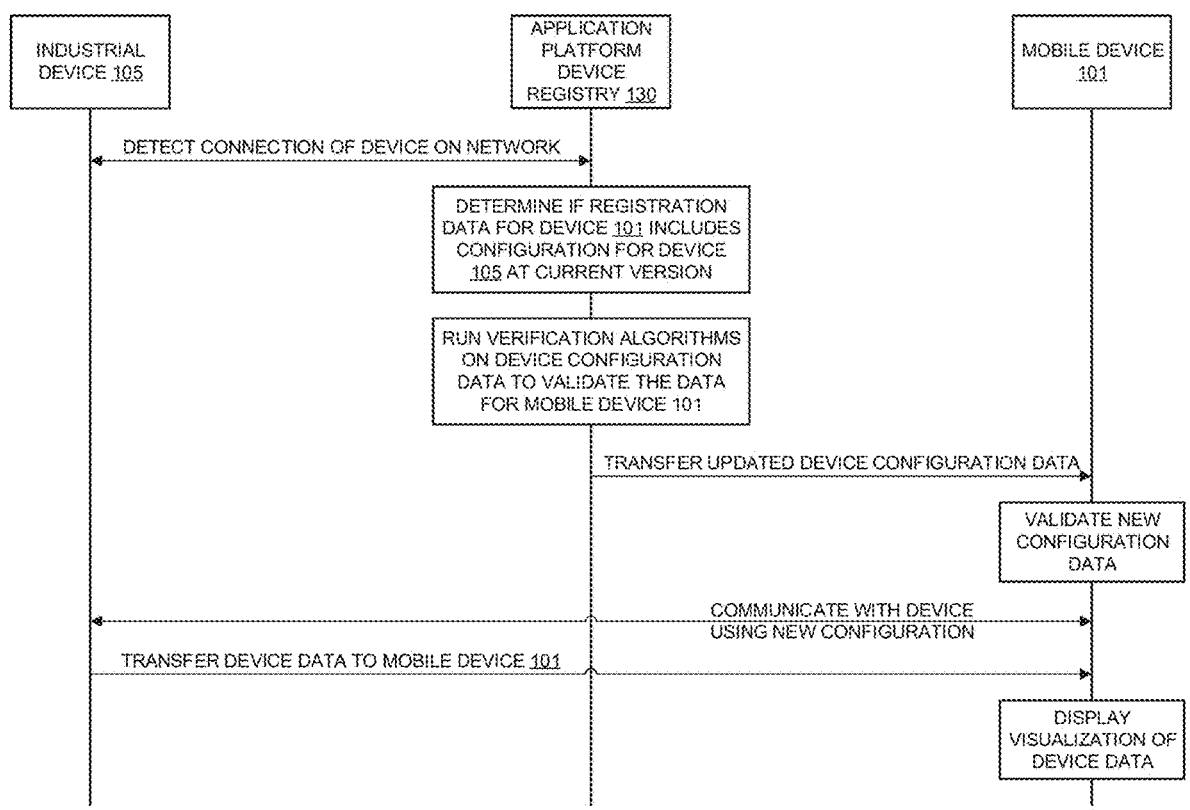
FIG. 3 is a sequence diagram that illustrates an operation of a communication system in an exemplary embodiment.
Figure 8:
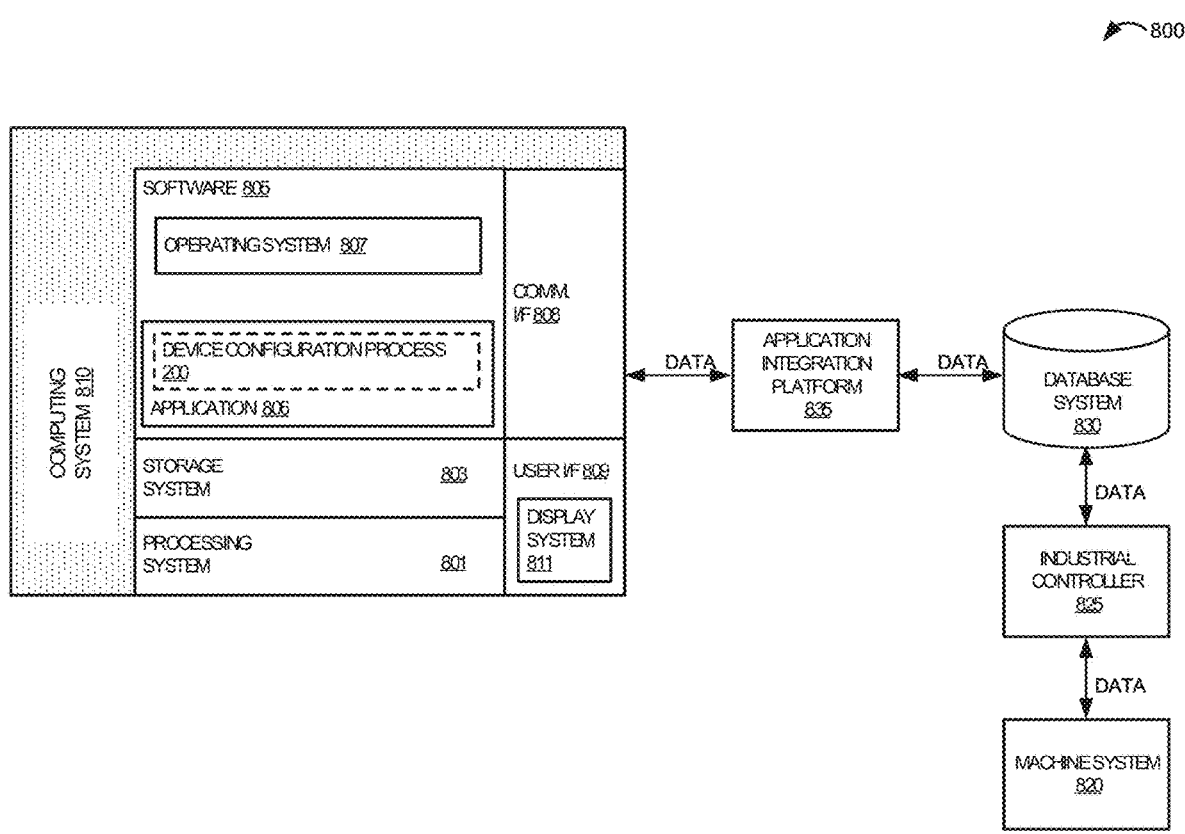
FIG. 8 is a block diagram that illustrates an operational scenario involving a computing system in an industrial automation environment in an exemplary implementation.
Figure 9:
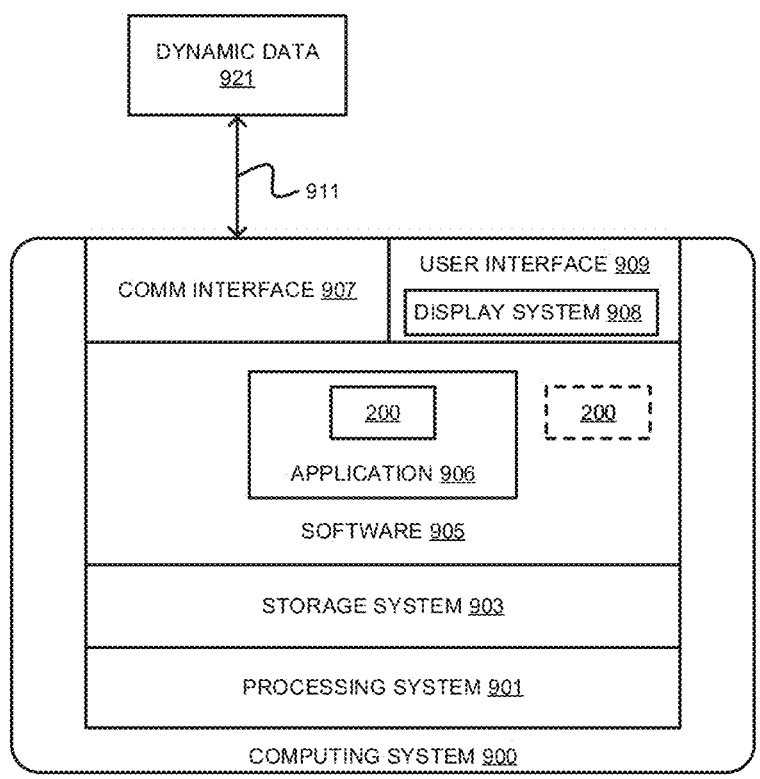
FIG. 9 is a block diagram that illustrates a computing system in an exemplary implementation.

Referring now to the drawings, FIG. 1 illustrates a cloud-based communication system of an industrial automation environment in an exemplary implementation. FIG. 2 illustrates a process flow in an exemplary embodiment, while FIG. 3 is a sequence diagram that illustrates an operation of a communication system in an exemplary embodiment. FIGS. 4-7 illustrate various exemplary graphical user interfaces of an application executing on a mobile device that uses device configuration data to retrieve data from an industrial device and present visualizations of the data. FIG. 8 illustrates an exemplary industrial automation environment that includes a computing system that may be used to execute a device configuration process, and FIG. 9 illustrates an exemplary computing system that may be used to perform any of the device configuration processes and operational scenarios described herein.

Turning now to FIG. 1, a communication system 100 of an industrial automation environment is illustrated. Communication system 100 provides an example of a communication system that may be used to implement a device configuration process 200 to facilitate device configuration for a mobile application associated with an industrial automation environment as described herein. Communication system 100 includes mobile device 101, industrial device 105, and factory cloud network 120. Mobile device 101 includes mobile application 103. In this example, mobile application 103 comprises an automation mobile application for use on a mobile device such as a smartphone, tablet, or laptop. Factory cloud network 120 includes application platform device registry server 130 and application platform application programming interface (API) 135. Application platform device registry service 130 includes device configuration data for mobile application 103. Application platform API 135 includes databases that store data that may be shared by a team of users of mobile application 103, among other data. Note that although shown as cloud services running in factory cloud network 120 in this example, application platform device registry server 130 and application platform API 135 could be running in an on-premise manufacturing network, such as a local communication network on the plant floor, or some other network or service, including combinations thereof. In some examples, mobile application 103 could comprise a FactoryTalk® TeamONE mobile application provided by Rockwell Automation, Inc.

In operation, mobile application 103 executes on mobile device 101 to perform various functions, which could include sending API calls over a hypertext transfer protocol secure (HTTPS) connection to application platform API 135 for storing or retrieving data in the database. Mobile application 103 also directs mobile device 101 to communicate with application platform device registry server 130 via factory cloud network 120 over an HTTPS connection for deploying device configuration data to mobile application 103 as described herein. In at least one implementation, the device configuration data comprises configuration data associated with industrial devices for mobile application 103. In some implementations, the device configuration data may also comprise additional data types, such as additional features or modules available for installation into mobile application 103, available applications for mobile device 101, the ability to find devices, available firmware and software, verification algorithms, errors, test sequences, device health, and other data descriptions. In at least one implementation, mobile device 101 could receive the device configuration data in response to mobile application 103 contacting application platform device registry server 130. In some implementations, mobile application 103 could include a list of network addresses at which to contact device registry servers, such as a uniform resource identifier (URI) of application platform device registry server 130. In some examples, mobile application 103 may direct mobile device 101 to connect with application platform device registry server 130 over factory cloud network 120 to communicate an indication of devices or device types that are in communication with mobile device 101, such as industrial device 105 in this example. Upon receiving the indication of the connected devices, application platform device registry server 130 could detect whether new or updated device configuration data for mobile application 103 associated with the devices exists on server 130.

In at least one implementation, device configuration data could be updated or new configuration data could be downloaded based on industrial automation devices discovered by mobile application 103 on the factory floor. For example, mobile application 103 could be provided with or detect connectivity information of factory devices, such as industrial controllers, machines, drives, motors, or some other industrial automation equipment, and upon detection and discovery of a particular device, the associated configuration data could be automatically downloaded and/or updated based on the version of the firmware and hardware discovered.

In some examples, the identification of the device configuration data may be visually presented by mobile application 103 on a display system of mobile device 101 for selection by a user of mobile device 101. Additionally or alternatively, the availability of the device configuration data may be visually presented in an administrative user interface associated with application platform device registry server 130 for selection by an administrator or team leader of a team of users that are collectively utilizing mobile application 103 on several individual devices. In this manner, the administrator can configure and control which device configuration data may be downloaded and installed into each instance of mobile application 103 for each team member. The selected device configuration data may then be deployed by application platform device registry server 130 over factory cloud network 120 for installation into mobile application 103 installed on the devices of the individual team members.

Application platform device registry server 130 also performs verification algorithms on the device configuration data to validate the device configuration prior to deployment. For example, to validate the device configuration data, application platform device registry server 130 could run validation algorithms to check that the data is compatible with mobile application 103. In another example, application platform device registry server 130 could perform vulnerability checks on the device configuration data, which may be particularly beneficial on new or updated device configuration data provided by third parties. For example, application platform device registry server 130 could perform the validation algorithms by running a test suite or framework on the device configuration data to conduct automated quality assurance testing on the device configuration. Any other validation algorithms may be performed by application platform device registry server 130 to validate the device configuration data and are within the scope of this disclosure.

In some examples, mobile application 103 could also perform its own validation and verification of the device configuration data to validate the integrity and security of the application when the device configuration is transferred to mobile device 101 by ensuring the data was transmitted accurately and securely. Mobile application 103 may direct mobile device 101 to validate the device configuration data prior to installing the device configuration data into application 103. For example, mobile application 103 could be configured to run a checksum or hash on the device configuration data to ensure the data was communicated accurately and securely from application platform device registry server 130, which could catch any man-in-the-middle attacks during data transmission. Upon successful validation, the device configuration data is installed into mobile application 103. However, application 103 would direct mobile device 101 to revert to a previous version when validation of the device configuration data fails, or simply not install the new or updated device configuration included in the device configuration data. In this manner, device configuration data may be identified, selected, verified, and deployed for installation into mobile application 103.

Upon receiving the device configuration data transmitted from application platform device registry server 130, mobile application 103 uses the device configuration data to retrieve data from an industrial device and present a visualization of the data retrieved from the device. For example, mobile application 103 could interpret the device configuration data and retrieve data from the device using the device configuration and present a visualization of the retrieved data using the device configuration. In at least one implementation, to interpret the device configuration data, mobile application 103 may direct mobile device 101 to process the device configuration data to determine at least a data retrieval configuration and a data visualization configuration, and then retrieve device data from an industrial device using the data retrieval configuration and present a visualization of the device data retrieved from the device using the data visualization configuration. The device data can be transmitted to the mobile application 103 running on mobile device 101 using any communication protocol, such as CIP, OPC UA, DPI, DSI, DALI, HTTP, REST, socket.IO, or any other interface or protocol, including combinations thereof. Once the device data is retrieved from the device, visualizations for the device data could also be defined in the device configuration data. Accordingly, mobile application 103 could interpret the device configuration data to generate visualizations of the device data based on the device configuration.

Advantageously, application platform device registry server 130 provides an extensible device registration system to provide the ability for mobile application 103 to configure device data acquisition and associated visualizations for any new industrial devices 105. By application platform device registry server 130 detecting, verifying, and deploying device configuration data to mobile application 103, data acquisition may be configured for new devices, instead of having to code new data retrieval instructions for the device as traditionally was required. Further, the visualizations for the retrieved device data can be configured for the mobile application 103 from the device configuration data as well. By utilizing the device registration system described herein, dynamic updates to particular device configurations installed into application 103 may be detected and deployed by application platform device registry server 130 based on the registry. In addition, multiple, heterogeneous communication protocols are supported, including various industrial protocols, machine-to-machine communication protocols, and others. In this manner, device configuration data may be identified, selected, verified, and deployed for installation into mobile application 103, which can then be interpreted to configure application 103 for device data acquisition from an industrial device 105 and visualizations for the retrieved device data. Exemplary operations of communication system 100 to facilitate device configuration for mobile application 103 associated with an industrial automation environment will now be discussed with respect to FIGS. 2 and 3.

FIG. 2 is a flow diagram that illustrates an operation of mobile device 101 in an exemplary implementation. The operation 200 shown in FIG. 2 may also be referred to as device configuration process 200 herein. The steps of the operation are indicated below parenthetically. The following discussion of operation 200 will proceed with reference to elements of communication system 100 of FIG. 1 in order to illustrate its operations, but note that the details provided in FIG. 1 are merely exemplary and not intended to limit the scope of process 200 to the specific implementation of FIG. 1.

Operation 200 may be employed by mobile device 101 to facilitate device configuration for mobile application 103 associated with an industrial automation environment. As shown in the operational flow of FIG. 2, mobile device 101 receives device configuration data for mobile application 103 transmitted from application platform device registry server 130 (201). The device configuration data may comprise configuration data associated with connected industrial devices for mobile application 103. In some examples, the device configuration data could further comprise additional data descriptions, such as the ability to discover, identify, and locate industrial devices, applications available for mobile device 101, additional features or subcomponents that are available for mobile application 103, available firmware and software, verification algorithms, errors, test sequences, device health, and other data types. Mobile device 101 may receive the device configuration data for mobile application 103 from application platform device registry server 130 in many situations. For example, in at least one implementation, device registry server 130 could maintain a list of industrial devices and their firmware or other version numbers for which mobile device 101 has previously received device configuration data, such that when a new device that is not in the list appears on the network or has a different version number than the one listed for mobile device 101, server 130 could automatically provide the device configuration data for those devices to mobile device 101. Device registry server 130 may also notify mobile device 101 of the existence of new or updated configuration data for connected industrial devices, and allow the user to elect whether or not to download the new configuration data.

In some implementations, mobile application 103 could include a list of network addresses at which to contact device registry servers, such as a uniform resource identifier (URI) of application platform device registry server 130, and mobile device 101 could receive the device configuration data in response to mobile application 103 contacting application platform device registry server 130. In some implementations, mobile device 101 could be configured to communicate an indication of industrial devices that are in communication with mobile device 101 to the application platform device registry server 130, wherein the application platform device registry server 130 is configured to detect whether updated device configuration data associated with the industrial devices is available for mobile application 103. In some examples, mobile device 101 could query device registry server 130 to discover for which of the currently connected industrial devices that mobile device 101 has outdated or missing configuration data. In another example, mobile application 103 may direct mobile device 101 to connect with application platform device registry server 130 to communicate an indication of industrial devices or device types that are in communication with mobile device 101, such as industrial device 105 in this example. Upon receiving the indication of the connected devices, application platform device registry server 130 could detect whether any new or updated device configuration data for mobile application 103 associated with the devices is available on server 130. In at least one implementation, device configuration data could be updated or new configuration data could be downloaded based on industrial automation devices discovered by mobile application 103 on the factory floor. For example, mobile application 103 could be provided with or detect connectivity information of industrial devices, such as industrial controllers, machines, drives, motors, or some other industrial automation equipment, and upon detection and discovery of a particular device, the associated configuration data could be automatically downloaded and/or updated based on the version of the firmware and hardware discovered. Other techniques of mobile device 101 receiving device configuration data for mobile application 103 transmitted from application platform device registry server 130 are possible and within the scope of this disclosure.

In some implementations, application platform device registry server 130 may also run verification algorithms on the device configuration data to validate the configuration prior to transmitting the device configuration data to mobile device 101. For example, application platform device registry server 130 may be configured to run validation algorithms to check that the device configuration data for mobile application 103 is compatible with mobile application 103 prior to transmitting the device configuration data. In another example, application platform device registry server 130 may be configured to perform vulnerability checks on the device configuration data for mobile application 103 prior to transmitting the device configuration data, which may be particularly beneficial on new or updated device configuration data provided by third parties. For example, application platform device registry server 130 could perform the validation algorithms by running a test suite or framework on the device configuration data to conduct automated quality assurance testing on the device configuration. In at least one implementation, mobile application 103 could also perform its own validation and verification of the device configuration data to validate the integrity and security of the device configuration data. For example, mobile device 101 could be configured to validate integrity of the device configuration data prior to installing the device configuration data into mobile application 103. For example, mobile application 103 could be configured to run a checksum or hash on the device configuration data to ensure the data was communicated accurately and securely from application platform device registry server 130, which could catch any man-in-the-middle attacks during data transmission. Other verification techniques and algorithms to validate the device configuration data are possible and within the scope of this disclosure.

Mobile device 101 processes the device configuration data to determine at least a data retrieval configuration and a data visualization configuration (202). In some examples, the device configuration data comprises at least a data retrieval configuration and a data visualization configuration for at least one industrial device. The data retrieval configuration may include protocols that may be used by mobile device 101 to communicate with particular industrial devices and receive industrial data, such as such as CIP, OPC UA, DPI, DSI, DALI, HTTP, REST, socket.IO, or any other interface device communication protocol, including combinations thereof. The data visualization configuration may include instructions for mobile device 101 to generate visualizations for the device data received from the industrial devices. Accordingly, in some examples mobile device 101 could interpret the data visualization configuration received in the device configuration data to generate visualizations of device data received from industrial devices. In at least one implementation, application platform device registry server 130 could be configured to provide a device registry service having mechanisms to store the device configuration data for mobile application 103. In this case, mobile device 101 may receive the device configuration data for mobile application 103 from application platform device registry server 130 by automatically receiving the device configuration data from the device registry service to enable dynamic registration of the data retrieval configuration and the data visualization configuration for connected industrial devices.

Mobile device 101 retrieves data from an industrial device using the data retrieval configuration (203). As discussed above, the data retrieval configuration may include communication protocols that may be used by mobile device 101 to communicate with particular industrial devices and receive industrial data, such as such as CIP, OPC UA, DPI, DSI, DALI, HTTP, REST, socket.IO, or any other interface device communication protocol, including combinations thereof. Multiple, heterogeneous communication protocols are supported, including various industrial protocols, machine-to-machine communication protocols, and others. Accordingly, mobile application 103 could utilize the data retrieval configuration to configure mobile device 101 to communicate with one or more industrial devices on the plant floor and receive device data from the industrial devices using one or more communication protocols identified in the data retrieval configuration.

Mobile device 101 presents a visualization of the data retrieved from the industrial device using the data visualization configuration (204). Once the device data is retrieved from the industrial device, visualizations for the device data could be defined in the data visualization configuration received in the device configuration data. Mobile application 103 may utilize the data visualization configuration to generate visualizations of the device data retrieved from the industrial devices.

Advantageously, by utilizing the device registration system described herein, dynamic updates to particular device configurations installed into mobile application 103 may be provided by application platform device registry server 130 based on the device registry. In this manner, device configuration data may be identified, selected, verified, and deployed for installation into mobile application 103, which can then be interpreted to configure application 103 for device data acquisition from an industrial device 105 and to generate visualizations for the retrieved device data. Another exemplary operation of communication system 100 to facilitate device configuration for mobile application 103 will now be discussed with respect to FIG. 3.

FIG. 3 is a sequence diagram that illustrates an operation of communication system 100 in an exemplary implementation. In this example, industrial device 105 represents an industrial device that has just been connected to the factory plant network with a new firmware version. Initially, application platform device registry server 130 detects the connection of industrial device 105 on the network. Whenever a new or updated version of an industrial device is detected on the network, device registry server 105 determines if the device configuration data for the detected device is current for each mobile device 101 presently connected to the network. Accordingly, device registry server 130 determines if registration data for mobile device 101 includes device configuration data for industrial device 105 at the current version. For example, whenever mobile application 103 running on mobile device 101 receives a new or updated device configuration for a particular industrial device 105, a record is made in the device registry of server 130 to indicate the current version of device configuration data that was received by mobile device 101 for industrial device 105. In this example, since industrial device 105 represents an industrial device that has just been connected to the factory network with a new firmware version, and the entry in the registry associated with industrial device 105 for mobile application 103 installed on mobile device 101 indicates that mobile application 103 has configuration data for an older firmware version of industrial device 105, device registry server 130 provides the appropriate device configuration data for industrial device 105 at the current firmware version.

Prior to sending the device configuration data to mobile device 101, device registry server 130 runs verification algorithms on the device configuration data to validate the data for mobile device 101. Among other safeguards, these verifications help to ensure that the device configuration data for industrial device 105 is compatible with mobile application 103 installed on mobile device 101. Upon successful validation, device registry server 130 transfers updated device configuration data to mobile device 101. Prior to installing the device configuration data into mobile application 103, mobile device 101 validates the new device configuration data for industrial device 105 at its current firmware version. In this example, mobile device 101 validates the new device configuration data by verifying the integrity of the data received from device registry server 130 using a checksum. Once mobile device 101 successfully validates the new device configuration data, mobile device 101 installs the device configuration data into mobile application 103. Mobile application 103 may then utilize the new device configuration data to communicate with industrial device 105 at the current firmware version. Industrial device 105 may then transfer device data to mobile device 101 using a communication protocol as defined in the device configuration data. Mobile device 101 may then display visualizations of the device data in mobile application 103, where the visualizations of the data are also defined in the device configuration data. Accordingly, dynamic updates to particular device configurations installed into application 103 may be detected and deployed by application platform device registry server 130 based on the registry. In this manner, device registry server 130 may identify, select, verify, and deploy device configuration data to mobile device 101 for installation into mobile application 103, which can then be interpreted to configure application 103 for data acquisition from an industrial device 105 and to generate and display visualizations for the retrieved device data. Some example graphical user interface displays provided by an automation mobile application that illustrate exemplary visualizations of device data retrieved and generated utilizing the device configuration techniques disclosed herein will now be discussed with respect to FIGS. 4-7.

Figure 4:
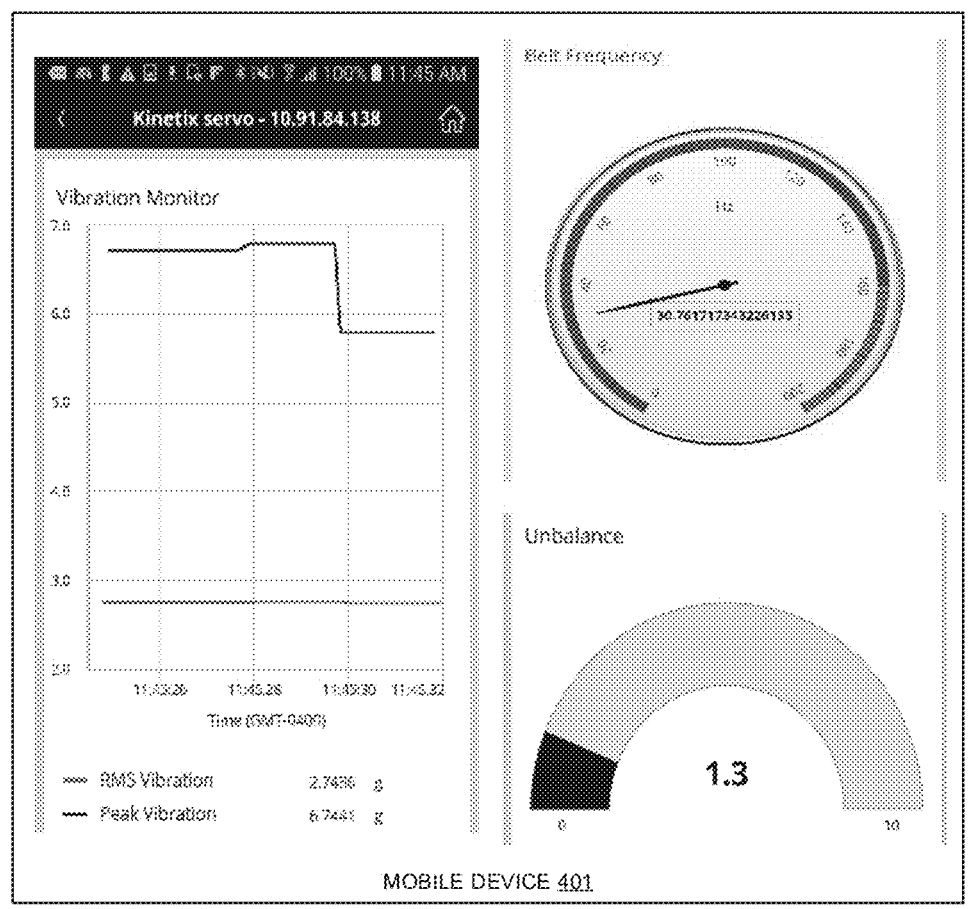
FIG. 4 is a block diagram that illustrates an operational scenario of a mobile application displayed on a mobile device in an exemplary implementation.

FIG. 4 is a block diagram that illustrates a display screen of an application executing on mobile device 401 in an exemplary implementation. In this example, the application comprises an automation mobile application for use on a mobile device such as a smartphone, tablet, or laptop. The display of the mobile application provides several visualizations of device data retrieved from a servo motor device. In particular, the visualizations include a vibration monitor trend diagram, a belt frequency gauge, and an unbalance meter. The vibration monitor trend indicates the root mean square (RMS) and peak vibration levels of the servo motor over time. The device data shown in the visualizations was acquired by the mobile application interpreting device configuration data for the servo motor device received from an application platform device registry server as described herein. In addition, the visualizations of the retrieved device data were also configured by the mobile application interpreting the device configuration data for the servo motor device. Another operational scenario of an application displayed on a mobile device in an exemplary implementation will now be described with respect to FIG. 5.

Figure 5:
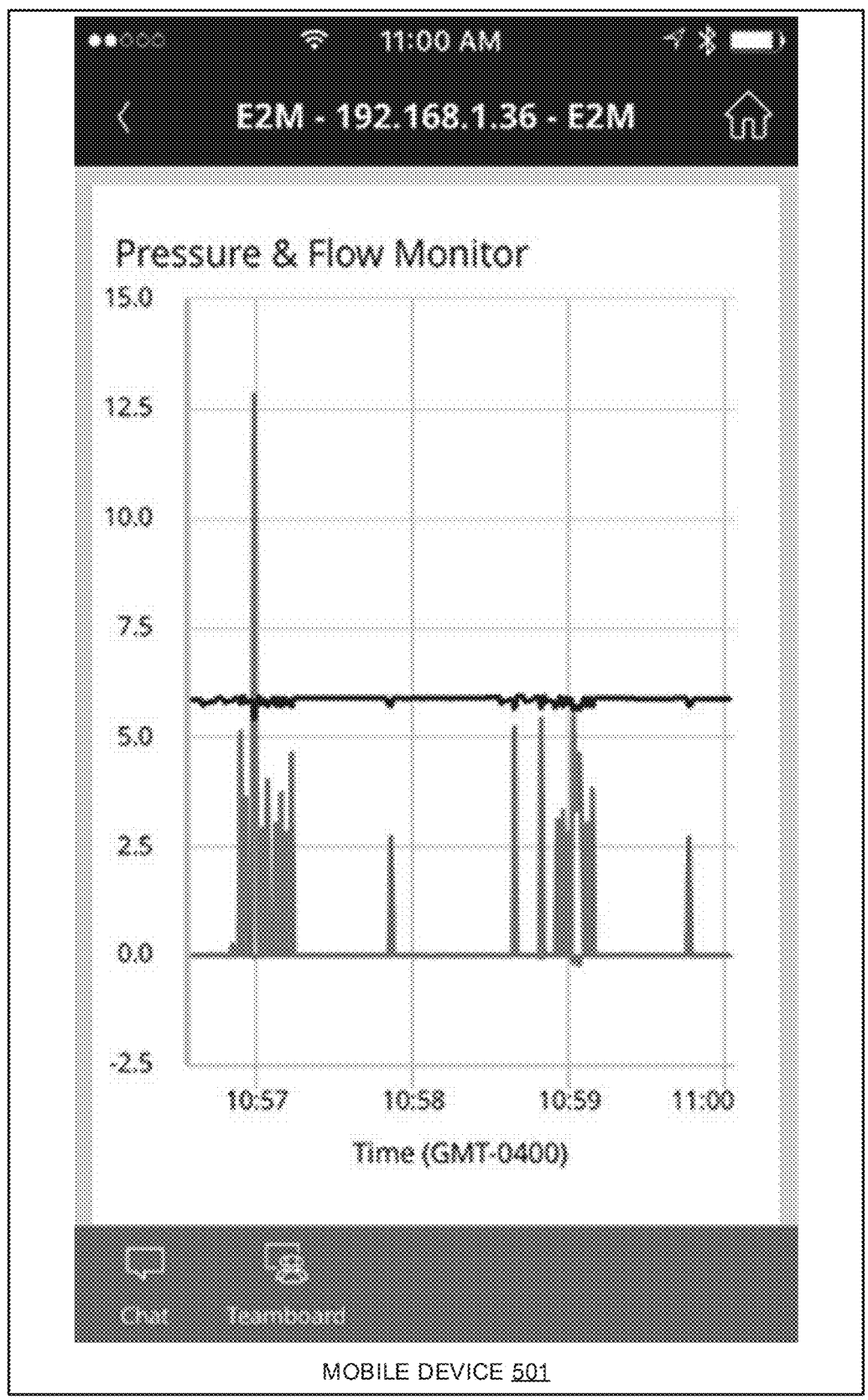
FIG. 5 is a block diagram that illustrates an operational scenario of a mobile application displayed on a mobile device in an exemplary implementation.

FIG. 5 is a block diagram that illustrates a display screen of an application executing on mobile device 501 in an exemplary implementation. In this example, the application comprises an automation mobile application for use on a mobile device such as a smartphone, tablet, or laptop. The display of the mobile application provides a visualization of device data retrieved from an industrial device. In particular, the visualization includes a pressure and flow monitor trend diagram. The pressure and flow monitor trend indicates pressure and flow levels of the industrial device over time. The device data shown in the visualizations was acquired by the mobile application interpreting device configuration data for the industrial device received from an application platform device registry server as described herein. In addition, the visualizations of the retrieved device data were also configured by the mobile application interpreting the device configuration data for the industrial device. Another operational scenario of an application displayed on a mobile device in an exemplary implementation will now be described with respect to FIG. 6.

Figure 6:
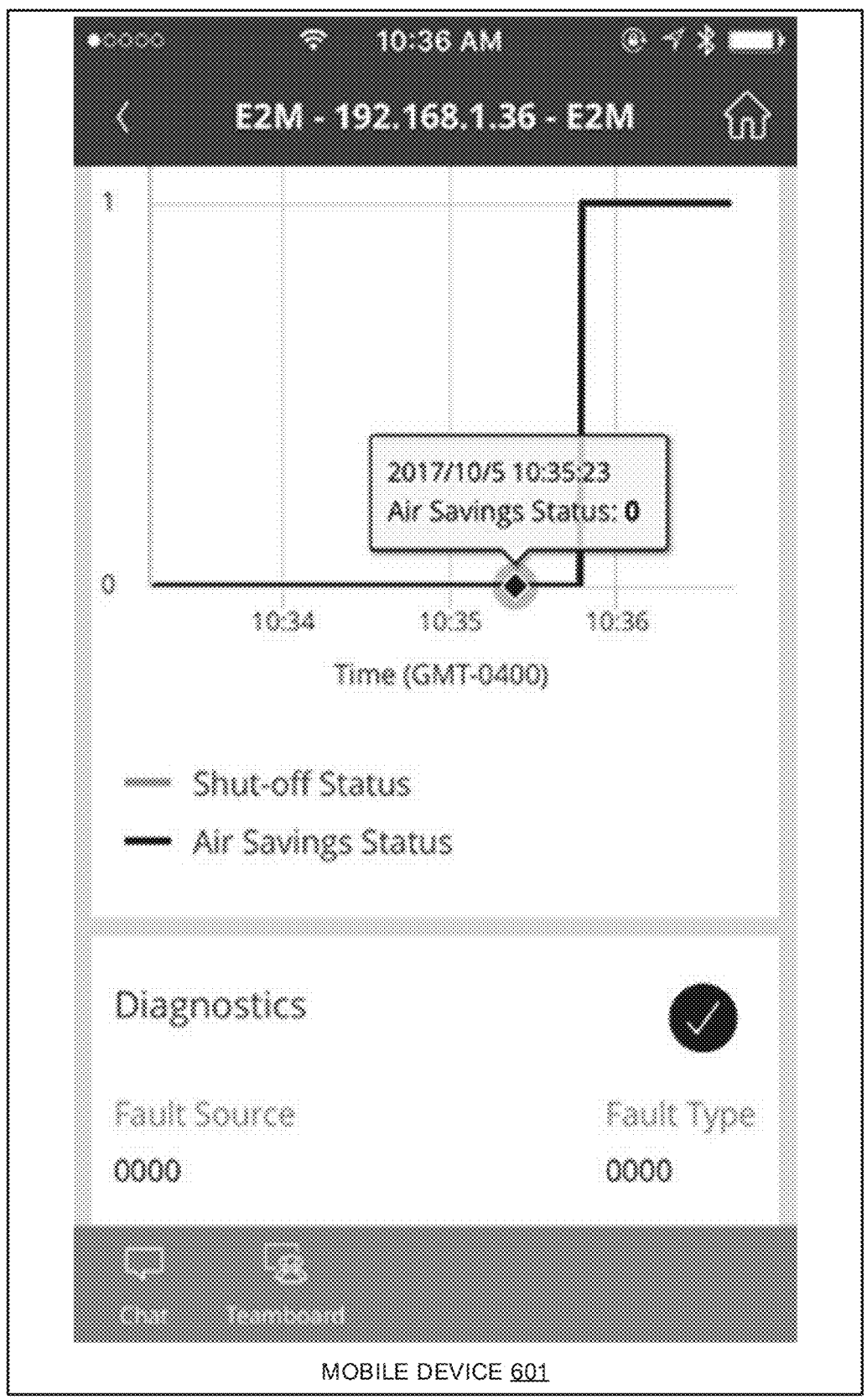
FIG. 6 is a block diagram that illustrates an operational scenario of a mobile application displayed on a mobile device in an exemplary implementation.

FIG. 6 is a block diagram that illustrates a display screen of an application executing on mobile device 601 in an exemplary implementation. In this example, the application comprises an automation mobile application for use on a mobile device such as a smartphone, tablet, or laptop. The display of the mobile application provides visualizations of device data retrieved from an industrial device. In particular, the visualizations include a shut-off status and air savings status trend diagram, and a diagnostics display panel. The shut-off status and air savings status trend indicates shut-off status and the air savings status of the industrial device over time. The diagnostics display panel indicates a fault source and fault type for the industrial device. The device data shown in the visualizations was acquired by the mobile application interpreting device configuration data for the industrial device received from an application platform device registry server as described herein. In addition, the visualizations of the retrieved device data were also configured by the mobile application interpreting the device configuration data for the industrial device. Another operational scenario of an application displayed on a mobile device in an exemplary implementation will now be described with respect to FIG. 7.

Figure 7:
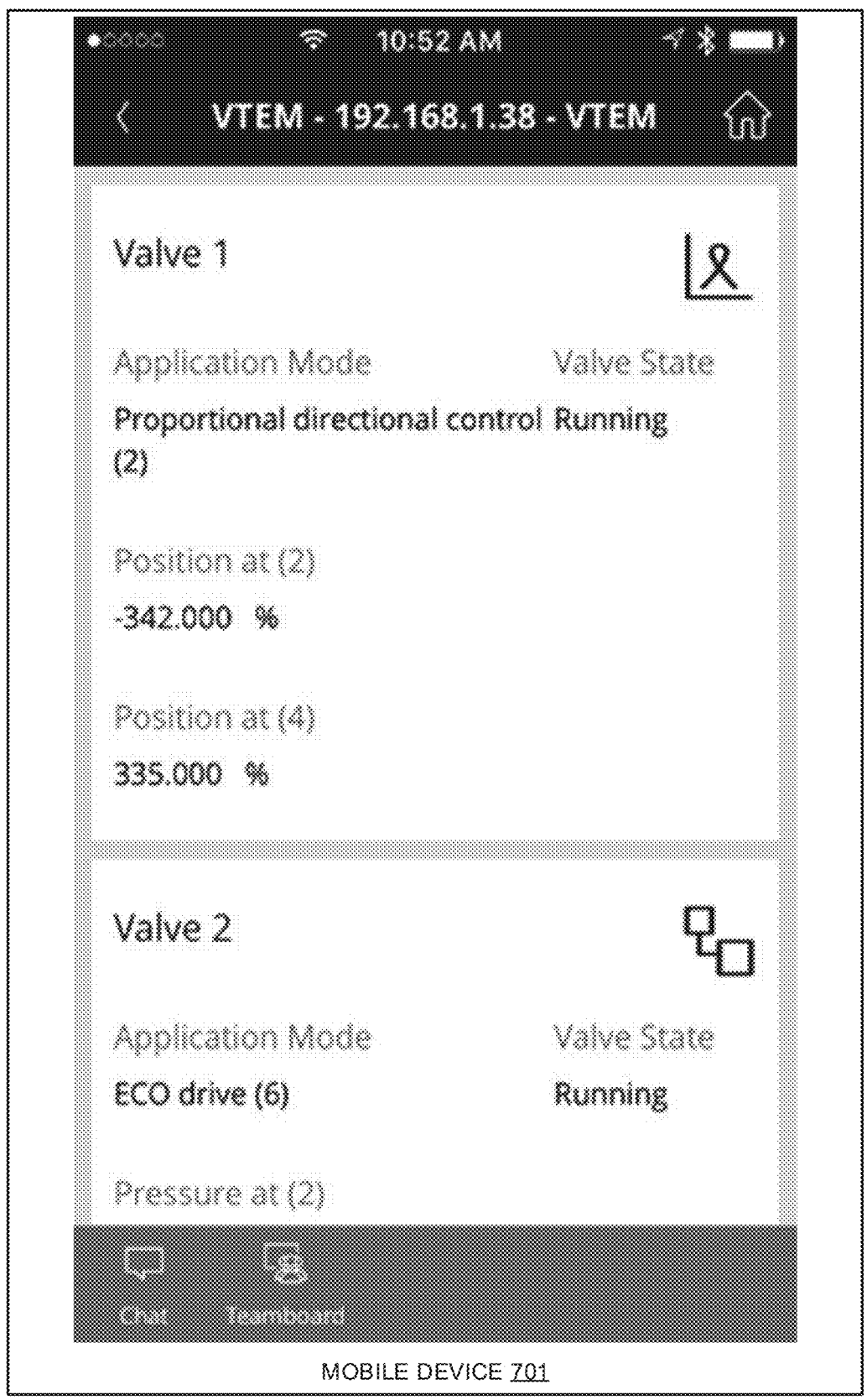
FIG. 7 is a block diagram that illustrates an operational scenario of a mobile application displayed on a mobile device in an exemplary implementation.

FIG. 7 is a block diagram that illustrates a display screen of an application executing on mobile device 701 in an exemplary implementation. In this example, the application comprises an automation mobile application for use on a mobile device such as a smartphone, tablet, or laptop. The display of the mobile application provides visualizations of device data retrieved from an industrial device. In particular, the visualizations include informational displays for two valves of the industrial device. The informational display for the first valve, labeled "Valve 1", includes a graphical icon representative of the valve, and indicates the valve state at various application modes. Specifically, the display indicates that the valve state is "running" for the proportional directional control application mode, and further indicates percentages for the valve state at positions two and four. Similarly, the informational display for the second valve, labeled "Valve 2", includes a graphical icon representative of the valve, and indicates the valve state at various application modes. In particular, the display indicates that the valve state is "running" for the ECO drive application mode, and further indicates the value pressure. The device data shown in the visualizations was acquired by the mobile application interpreting device configuration data for the industrial device received from an application platform device registry server as described herein. In addition, the visualizations of the retrieved device data were also configured by the mobile application interpreting the device configuration data for the industrial device.

Now referring back to FIG. 1, mobile device 101 comprises a processing system and communication transceiver. Mobile device 101 may also include other components such as a user interface, data storage system, and power supply. Mobile device 101 may reside in a single device or may be distributed across multiple devices. Examples of mobile device 101 include mobile computing devices, such as cell phones, tablet computers, laptop computers, notebook computers, and gaming devices, as well as any other type of mobile computing devices and any combination or variation thereof. Examples of mobile device 101 may also include desktop computers, server computers, and virtual machines, as well as any other type of computing system, variation, or combination thereof. In some implementations, mobile device 101 could comprise a mobile device capable of operating in a server-like fashion which, among other uses, could be utilized in a wireless mesh network.

Factory cloud network 120 could comprise multiple network elements such as routers, gateways, telecommunication switches, servers, processing systems, or other communication equipment and systems for providing communication and data services. In some examples, factory cloud network 120 could comprise wireless communication nodes, telephony switches, Internet routers, network gateways, computer systems, communication links, or some other type of communication equipment, including combinations thereof. Factory cloud network 120 may also comprise optical networks, packet networks, wireless mesh networks (WMN), local area networks (LAN), metropolitan area networks (MAN), wide area networks (WAN), or other network topologies, equipment, or systems, including combinations thereof. Factory cloud network 120 may be configured to communicate over metallic, wireless, or optical links. Factory cloud network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, factory cloud network 120 includes further access nodes and associated equipment for providing communication services to several computer systems across a large geographic region.

Application platform device registry server 130 may be representative of any computing apparatus, system, or systems on which the techniques disclosed herein or variations thereof may be suitably implemented. Application platform device registry server 130 comprises a processing system and communication transceiver. Application platform device registry server 130 may also include other components such as a router, server, data storage system, and power supply. Application platform device registry server 130 may reside in a single device or may be distributed across multiple devices. Application platform device registry server 130 may be a discrete system or may be integrated within other systems, including other systems within communication system 100. Some examples of application platform device registry server 130 include desktop computers, server computers, cloud computing platforms, and virtual machines, as well as any other type of computing system, variation, or combination thereof. In some examples, application platform device registry server 130 could comprise a cloud-based service, network switch, router, switching system, packet gateway, authentication, authorization, and accounting (AAA) server, billing system, network gateway system, Internet access node, application server, database system, service node, firewall, or some other communication system, including combinations thereof.

Turning now to FIG. 8, a block diagram that illustrates an industrial automation environment 800 in an exemplary implementation is shown. Industrial automation environment 800 provides an example of an industrial automation environment that may be utilized to implement the device configuration processes disclosed herein, but other environments could also be used. Industrial automation environment 800 includes computing system 810, machine system 820, industrial controller 825, database system 830, and application integration platform 835. Computing system 810 provides an example of mobile devices 101, 401, 501, 601, and 701, although such mobile devices could use alternative configurations. Application integration platform 835 provides an example of application platform device registry server 130, although server 130 could use alternative configurations. Machine system 820 and controller 825 are in communication over a communication link, controller 825 and database system 830 communicate over a communication link, database system 830 and application integration platform 835 communicate over a communication link, and application integration platform 835 and computing system 810 are in communication over a communication link. Note that there would typically be many more machine systems in most industrial automation environments, but the number of machine systems shown in FIG. 8 has been restricted for clarity.

Industrial automation environment 800 comprises an automobile manufacturing factory, food processing plant, oil drilling operation, microprocessor fabrication facility, or some other type of industrial enterprise. Machine system 820 could comprise a sensor, drive, pump, filter, drill, motor, robot, fabrication machinery, mill, printer, or any other industrial automation equipment, including their associated control systems. A control system comprises, for example, industrial controller 825, which could include automation controllers, programmable logic controllers (PLCs), programmable automation controllers (PACs), or any other controllers used in automation control. Additionally, machine system 820 could comprise other industrial equipment, such as a brew kettle in a brewery, a reserve of coal or other resources, or any other element that may reside in an industrial automation environment 800.

Machine system 820 continually produces operational data over time. The operational data indicates the current status of machine system 820, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 820 and/or controller 825 is capable of transferring the operational data over a communication link to database system 830, application integration platform 835, and computing system 810, typically via a communication network. Database system 830 could comprise a disk, tape, integrated circuit, server, or some other memory device. Database system 830 may reside in a single device or may be distributed among multiple memory devices.

Application integration platform 835 comprises a processing system and a communication transceiver. Application integration platform 835 may also include other components such as a router, server, data storage system, and power supply. Application integration platform 835 may reside in a single device or may be distributed across multiple devices. Application integration platform 835 may be a discrete system or may be integrated within other systems—including other systems within industrial automation environment 800. In some examples, application integration platform 835 could comprise a FactoryTalk® VantagePoint server system provided by Rockwell Automation, Inc.

The communication links over which data is exchanged between machine system 820, industrial controller 825, database system 830, application integration platform 835, and communication interface 808 of computing system 810 could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 810 may be representative of any computing apparatus, system, or systems on which the device configuration processes disclosed herein or variations thereof may be suitably implemented. Computing system 810 provides an example of a computing system that could be used as a either a server or a client device in some implementations, although such devices could have alternative configurations. Examples of computing system 810 include mobile computing devices, such as cell phones, tablet computers, laptop computers, notebook computers, and gaming devices, as well as any other type of mobile computing devices and any combination or variation thereof. Examples of computing system 810 also include desktop computers, server computers, and virtual machines, as well as any other type of computing system, variation, or combination thereof. In some implementations, computing system 810 could comprise a mobile device capable of operating in a server-like fashion which, among other uses, could be utilized in a wireless mesh network.

Computing system 810 includes processing system 801, storage system 803, software 805, communication interface 808, and user interface 809. Processing system 801 is operatively coupled with storage system 803, communication interface 808, and user interface 809. Processing system 801 loads and executes software 805 from storage system 803. Software 805 includes application 806 and operating system 807. Application 806 may include device configuration process 200 in some examples, as indicated by the dashed line in FIG. 8. When executed by computing system 810 in general, and processing system 801 in particular, software 805 directs computing system 810 to operate as described herein for device configuration process 200 or variations thereof. In this example, user interface 809 includes display system 811, which itself may be part of a touch screen that also accepts user inputs via touches on its surface. Computing system 810 may optionally include additional devices, features, or functionality not discussed here for purposes of brevity.

Referring now to FIG. 9, a block diagram that illustrates computing system 900 in an exemplary implementation is shown. Computing system 900 provides an example of mobile devices 101, 401, 501, 601 and 701, application platform device registry server 130, or any computing system that may be used to execute device configuration process 200 or variations thereof, although such systems could use alternative configurations. Computing system 900 includes processing system 901, storage system 903, software 905, communication interface 907, and user interface 909. User interface 909 comprises display system 908. Software 905 includes application 906 which itself includes device configuration process 200. Device configuration process 200 may optionally be implemented separately from application 906, as indicated by the dashed lines surrounding process 200 in FIG. 9.

Computing system 900 may be representative of any computing apparatus, system, or systems on which application 906 and device configuration process 200 or variations thereof may be suitably implemented. Examples of computing system 900 include mobile computing devices, such as cell phones, tablet computers, laptop computers, notebook computers, and gaming devices, as well as any other type of mobile computing devices and any combination or variation thereof. Note that the features and functionality of computing system 900 may apply as well to desktop computers, server computers, and virtual machines, as well as any other type of computing system, variation, or combination thereof.

Computing system 900 includes processing system 901, storage system 903, software 905, communication interface 907, and user interface 909. Processing system 901 is operatively coupled with storage system 903, communication interface 907, and user interface 909. Processing system 901 loads and executes software 905 from storage system 903. When executed by computing system 900 in general, and processing system 901 in particular, software 905 directs computing system 900 to operate as described herein for device configuration process 200 or variations thereof. Computing system 900 may optionally include additional devices, features, or functionality not discussed herein for purposes of brevity.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations, or variations thereof.

Storage system 903 may comprise any computer-readable storage media capable of storing software 905 and readable by processing system 901. Storage system 903 may include volatile and nonvolatile, removable and non-removable media implemented in any method or technology for storage of information, such as computer readable instructions, data structures, program modules, or other data. Storage system 903 may be implemented as a single storage device but may also be implemented across multiple storage devices or sub-systems co-located or distributed relative to each other. Storage system 903 may comprise additional elements, such as a controller, capable of communicating with processing system 901. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 909, processing system 901 loads and executes portions of software 905, such as device configuration process 200, to render a graphical user interface for application 906 for display by display system 908 of user interface 909. Software 905 may be implemented in program instructions and among other functions may, when executed by computing system 900 in general or processing system 901 in particular, direct computing system 900 or processing system 901 to receive device configuration data for a mobile application transmitted from an application platform device registry server. Software 905 may further direct computing system 900 or processing system 901 to process the device configuration data to determine at least a data retrieval configuration and a data visualization configuration. Software 905 may further direct computing system 900 or processing system 901 to retrieve data from an industrial device using the data retrieval configuration. Finally, software 905 may direct computing system 900 or processing system 901 to present a visualization of the data retrieved from the industrial device using the data visualization configuration.

Software 905 may include additional processes, programs, or components, such as operating system software or other application software. Examples of operating systems include Windows®, iOS®, and Android®, as well as any other suitable operating system. Software 905 may also comprise firmware or some other form of machine-readable processing instructions executable by processing system 901.

In general, software 905 may, when loaded into processing system 901 and executed, transform computing system 900 overall from a general-purpose computing system into a special-purpose computing system customized to facilitate device configuration for a mobile application associated with an industrial automation environment as described herein for each implementation. For example, encoding software 905 on storage system 903 may transform the physical structure of storage system 903. The specific transformation of the physical structure may depend on various factors in different implementations of this description. Examples of such factors may include, but are not limited to the technology used to implement the storage media of storage system 903 and whether the computer-storage media are characterized as primary or secondary storage.

In some examples, if the computer-storage media are implemented as semiconductor-based memory, software 905 may transform the physical state of the semiconductor memory when the program is encoded therein. For example, software 905 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 900 is generally intended to represent a computing system with which software 905 is deployed and executed in order to implement application 906 and/or device configuration process 200 (and variations thereof). However, computing system 900 may also represent any computing system on which software 905 may be staged and from where software 905 may be distributed, transported, downloaded, or otherwise provided to yet another computing system for deployment and execution, or yet additional distribution. For example, computing system 900 could be configured to deploy software 905 over the internet to one or more client computing systems for execution thereon, such as in a cloud-based deployment scenario.

Communication interface 907 may include communication connections and devices that allow for communication between computing system 900 and other computing systems (not shown) or services, over a communication network 911 or collection of networks. In some implementations, communication interface 907 receives dynamic data 921 over communication network 911. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 909 may include a voice input device, a touch input device for receiving a gesture from a user, a motion input device for detecting non-touch gestures and other motions by a user, and other comparable input devices and associated processing elements capable of receiving user input from a user. Output devices such as display system 908, speakers, haptic devices, and other types of output devices may also be included in user interface 909. The aforementioned user input devices are well known in the art and need not be discussed at length here. User interface 909 may also include associated user interface software executable by processing system 901 in support of the various user input and output devices discussed above. Separately or in conjunction with each other and other hardware and software elements, the user interface software and devices may provide a graphical user interface, a natural user interface, or any other kind of user interface. User interface 909 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more computer-readable storage media having program instructions stored thereon to facilitate device configuration for a mobile application associated with an industrial automation environment, wherein the program instructions, when executed by a computing system, direct the computing system to at least:
   receive device configuration data for the mobile application associated with an industrial device transmitted from an application platform device registry server;
   process the device configuration data to determine at least a data retrieval configuration that configures the mobile application to retrieve data from the industrial device and a data visualization configuration that configures the mobile application to display visualizations of the data retrieved from the industrial device;
   retrieve device data from the industrial device using the data retrieval configuration; and
   present a visualization of the device data retrieved from the industrial device using the data visualization configuration.

2. The one or more computer-readable storage media of claim 1 wherein the application platform device registry server is configured to provide a device registry service having mechanisms to store the device configuration data for the mobile application.

3. The one or more computer-readable storage media of claim 2 wherein the program instructions direct the computing system to receive the device configuration data for the mobile application by directing the computing system to automatically receive the device configuration data from the device registry service for dynamic registration of the data retrieval configuration and the data visualization configuration for connected industrial devices.

4. The one or more computer-readable storage media of claim 1 wherein the program instructions further direct the computing system to communicate an indication of industrial devices that are in communication with the computing system to the application platform device registry server, wherein the application platform device registry server is configured to detect whether updated device configuration data associated with the industrial devices is available for the mobile application.

5. The one or more computer-readable storage media of claim 1 wherein the application platform device registry server is configured to run validation algorithms to check that the device configuration data for the mobile application is compatible with the mobile application prior to transmitting the device configuration data.

6. The one or more computer-readable storage media of claim 1 wherein the application platform device registry server is configured to perform vulnerability checks on the device configuration data for the mobile application prior to transmitting the device configuration data.

7. The one or more computer-readable storage media of claim 1 wherein the program instructions further direct the computing system to validate integrity of the device configuration data prior to installing the device configuration data into the mobile application.

8. A method to facilitate device configuration for a mobile application associated with an industrial automation environment, the method comprising:
   receiving device configuration data for the mobile application associated with an industrial device transmitted from an application platform device registry server;
   processing the device configuration data to determine at least a data retrieval configuration that configures the mobile application to retrieve data from the industrial device and a data visualization configuration that configures the mobile application to display visualizations of the data retrieved from the industrial device;

retrieving device data from the industrial device using the data retrieval configuration; and presenting a visualization of the device data retrieved from the industrial device using the data visualization configuration.

9. The method of claim 8 wherein the application platform device registry server is configured to provide a device registry service having mechanisms to store the device configuration data for the mobile application.

10. The method of claim 9 wherein receiving the device configuration data for the mobile application comprises automatically receiving the device configuration data from the device registry service for dynamic registration of the data retrieval configuration and the data visualization configuration for connected industrial devices.

11. The method of claim 8 further comprising transmitting an indication of industrial devices that are in communication with the computing system for delivery to the application platform device registry server, wherein the application platform device registry server is configured to detect whether updated device configuration data associated with the industrial devices is available for the mobile application.

12. The method of claim 8 wherein the application platform device registry server is configured to run validation algorithms to check that the device configuration data for the mobile application is compatible with the mobile application prior to transmitting the device configuration data.

13. The method of claim 8 wherein the application platform device registry server is configured to perform vulnerability checks on the device configuration data for the mobile application prior to transmitting the device configuration data.

14. The method of claim 8 further comprising validating integrity of the device configuration data prior to installing the device configuration data into the mobile application.

15. An apparatus to facilitate device configuration for a mobile application associated with an industrial automation environment, the apparatus comprising:
one or more computer-readable storage media;
a processing system operatively coupled with the one or more computer-readable storage media; and
program instructions stored on the one or more computer-readable storage media that, when executed by the processing system, direct the processing system to at least:

receive device configuration data for the mobile application associated with an industrial device transmitted from an application platform device registry server;

process the device configuration data to determine at least a data retrieval configuration that configures the mobile application to retrieve data from the industrial device and a data visualization configuration that configures the mobile application to display visualizations of the data retrieved from the industrial device;

retrieve device data from the industrial device using the data retrieval configuration; and present a visualization of the device data retrieved from the industrial device using the data visualization configuration.

16. The apparatus of claim 15 wherein the application platform device registry server is configured to provide a device registry service having mechanisms to store the device configuration data for the mobile application.

17. The apparatus of claim 16 wherein the program instructions direct the processing system to receive the device configuration data for the mobile application by directing the processing system to automatically receive the device configuration data from the device registry service for dynamic registration of the data retrieval configuration and the data visualization configuration for connected industrial devices.

18. The apparatus of claim 15 wherein the program instructions further direct the processing system to communicate an indication of connected industrial devices to the application platform device registry server, wherein the application platform device registry server is configured to detect whether updated device configuration data associated with the connected industrial devices is available for the mobile application.

19. The apparatus of claim 15 wherein the application platform device registry server is configured to run validation algorithms to check that the device configuration data for the mobile application is compatible with the mobile application prior to transmitting the device configuration data.

20. The apparatus of claim 15 wherein the application platform device registry server is configured to perform vulnerability checks on the device configuration data for the mobile application prior to transmitting the device configuration data.

* * * * *